US009022373B2

(12) United States Patent
Muramatsu

(10) Patent No.: US 9,022,373 B2
(45) Date of Patent: May 5, 2015

(54) SLIDE OPERATION-TYPE DOVETAIL GROOVE SLIDING STAGE

(75) Inventor: Hiroaki Muramatsu, Hachioji (JP)

(73) Assignee: Miruc Optical Co., Ltd. (JP)

( * ) Notice: Subject to any disclaimer, the term of this patent is extended or adjusted under 35 U.S.C. 154(b) by 1 day.

(21) Appl. No.: 14/115,585

(22) PCT Filed: May 2, 2012

(86) PCT No.: PCT/JP2012/062080
§ 371 (c)(1),
(2), (4) Date: Nov. 4, 2013

(87) PCT Pub. No.: WO2012/150723
PCT Pub. Date: Nov. 8, 2012

(65) Prior Publication Data
US 2014/0090496 A1  Apr. 3, 2014

(30) Foreign Application Priority Data

May 2, 2011  (JP) .................................. 2011-103275

(51) Int. Cl.
*B23Q 1/28*  (2006.01)
*G12B 5/00*  (2006.01)
*F16H 21/44*  (2006.01)

(52) U.S. Cl.
CPC . *F16H 21/44* (2013.01); *G12B 5/00* (2013.01)

(58) Field of Classification Search
USPC ...................... 269/55, 76; 33/1 M; 74/490.13; 359/391–393
See application file for complete search history.

(56) References Cited

FOREIGN PATENT DOCUMENTS

| JP | 57-53810 | | 9/1980 |
| JP | 58-11092 | Y2 | 3/1983 |
| JP | 62-185657 | A | 8/1987 |
| JP | 4505535 | B1 | 4/2010 |
| JP | 2010-223611 | A | 10/2010 |
| JP | 4606501 | B2 | 10/2010 |

OTHER PUBLICATIONS

Japanese Office Action for Japanese application No. 2011-103275, transmitted Jun. 21, 2011, with Partial English translation.

*Primary Examiner* — Lee D Wilson
*Assistant Examiner* — Jamal Daniel
(74) *Attorney, Agent, or Firm* — Cantor Colburn LLP

(57) ABSTRACT

The slide operation-type dovetail groove sliding stage may include a sliding lock screw for locking sliding of a sliding component, by causing the screw to abut on an inverted triangle-shaped protrusion, provided on a sidewall of a sliding component approximately parallel to a sliding direction and coupled to the sliding component, to bring the protrusion into contact with a dovetail of the fixed component and by tightening the screw. The sliding lock screw may be used as a sliding adjustment screw for performing fine adjustment of a degree of sliding of the sliding component with respect to the fixed component by adjusting an amount of rotation of the screw which abuts on the protrusion to bring it into contact with the dovetail of the sliding component, and a driving means which an operator grasps to perform an operation of sliding the sliding component to a desired position.

8 Claims, 7 Drawing Sheets

SLIDE OPERATION-TYPE DOVETAIL GROOVE SLIDING STAGE

This is the U.S. national stage of application No. PCT/JP2012/062080, filed on 2 May 2012. Priority under 35 U.S.C. §119(a) and 35 U.S.C. §365(b) is claimed from Japanese Application No. 2011-103275, filed 2 May 2011, the disclosure of which is also incorporated herein by reference.

TECHNICAL FIELD

The present invention relates to a slide operation-type dovetail groove sliding stage. More particularly, it relates to a dovetail groove sliding stage for performing positional adjustment of a precision apparatus by fitting a trapezoidally-projecting dovetail into a trapezoidally-recessed dovetail groove to slide a sliding component with respect to a fixed component, and performing an operation of sliding the sliding component with a driving means.

BACKGROUND ART

In general, depending on a driving means, a rack-and-pinion-type dovetail groove sliding stage or a feed-screw-type dovetail groove sliding stage is used as a dovetail groove sliding stage for performing positional adjustment of a precision apparatus. A rack-and-pinion-type dovetail groove sliding stage has a mechanism in which positional adjustment of a precision apparatus is performed by rotation of a pinion gear, which is one of a pair of engaged driving means consisting of a rack and a pinion gear, by means of a control knob, to cause a rack, the other of the pair, to travel straight, thereby sliding the sliding component. In addition, a feed-screw-type dovetail groove sliding stage has a mechanism in which positional adjustment of a precision apparatus is performed by rotation of a male-threaded rod, one of a pair of engaged driving means consisting of the male-threaded rod and a female-threaded cylinder, by means of a control knob, to cause the mail-threaded rod to travel straight, thereby sliding the sliding component.

With reference to FIG. 2 of Japanese Patent No. 4606501, a driving means for a rack-and-pinion type dovetail groove sliding stage is described. The driving means by a rack and a pinion gear is a driving means in which a rack (symbol 1 in FIG. 2 of Japanese Patent No. 4606501) fixed to a sliding component is engaged with a pinion gear (symbol 14 of the same) in which a control knob and a revolving shaft are connected to be identical and which is supported by a fixed component, and upon rotation of the control knob (symbol 9 of the same), the pinion gear interlockingly rotates to slide on the rack and the sliding component slides with respect to the fixed component. Specifically, the control knob is mounted in a direction intersecting a sliding direction of the sliding component. Combined with a sliding mechanism referred to as a dovetail groove type stage, to be described below, the rack-and-pinion-type manual stage is a driving means which slides about 18 mm in one turn of the control knob and is suitable when a quick, wide motion is needed.

With reference to FIG. 22 of Japanese Patent No. 4606501, a driving means for a feed-screw-type dovetail groove sliding stage is described. A feed-screw-type driving means is a sliding means for sliding a sliding component with respect to a fixed component by engaging a female-threaded cylinder (symbol 306 in FIG. 22 of Japanese Patent No. 4606501) connected to a rear face of a sliding component to which a precision apparatus is mounted with a male-threaded rod (symbol 307 of the same) penetrating a block fixed to the fixed component connected to a base, and rotating the male-threaded rod through operation of a control knob (symbol 309 of the same). Specifically, the control knob is fixed in a same direction as a sliding direction of the sliding component. Combined with a sliding mechanism referred to as a dovetail groove type stage, to be described below, the feed-screw-type manual stage is a driving means which slides about 4.2 mm in one turn of the control knob, and is suitable when load bearing is required and fine adjustment is needed.

With reference to FIG. 1 of Japanese Patent No. 4505535, a sliding mechanism by a dovetail groove is described. In general, in a rack-and-pinion-type dovetail groove sliding stage and a feed-screw-type dovetail groove sliding stage, a dovetail groove type sliding stage is used as a sliding mechanism for smoothly sliding a sliding component with respect to a fixed component. A dovetail groove type sliding stage refers to a stage in which a sliding component having a trapezoidally-projecting dovetail (symbol 2 in FIG. 1 of Japanese Patent No. 4606501) is fitted into a fixed component having a trapezoidally-recessed dovetail groove (symbol 3 of the same), so that the sliding component smoothly slides with respect to the fixed component.

With reference to FIG. 3 of Japanese Patent No. 4505535, a stopper mechanism is described which locks sliding of a sliding component at a desired position in a dovetail groove manual stage and sets a position of a precision apparatus attached to the sliding component. A sliding lock screw (symbol 10 in FIG. 3 of Japanese Patent No. 4505535) is fixed to a side surface of a fixed component, and a groove (symbol 32 of the same) is provided so that an inverted triangle-shaped protrusion (symbol 31 of the same) is formed on a side of a dovetail groove of the fixed component. Then, a sliding lock screw tip abuts from the groove against the protrusion to incline the protrusion inward, holding down a dovetail of the sliding component fitted into the dovetail groove of the fixed component, and thereby fixing the position of the sliding component with respect to the fixed component.

SUMMARY OF INVENTION

Technical Problem

A conventional dovetail groove sliding stage uses a control knob as a driving means. Specifically, a rack-and-pinion-type dovetail groove sliding stage is a mechanism in which upon rotation of the control knob, a pinion gear interlockingly rotates to sliding onto a rack, and a sliding component slides with respect to a fixed component. Also, a feed-screw-type dovetail groove sliding stage is a mechanism in which operation of the control knob causes a male-threaded rod to rotate to slide in a female-threaded cylinder, and a sliding component slides with respect to a fixed component. Thus, the control knob is an essential component in the conventional dovetail groove sliding stage. Furthermore, combined with a driving means by a rack and a pinion gear or a driving means by the male-threaded rod and the female-threaded cylinder, the conventional dovetail groove sliding stage becomes a complicated mechanism, thus having a problem of operability or durability.

In addition, for easy rotating operations, the control knob is made to be a larger component than other components. Thus, height of a dovetail groove sliding stage is determined by that of the control knob, which leads to a problem that the entire dovetail groove sliding stage becomes bulky.

Another problem is that since the conventional dovetail groove sliding stage causes the sliding component to slide by rotation of the control knob, it takes time to widely move the sliding component, making it difficult to quickly perform a sliding operation.

Hence, an object of the present invention is to provide a slide operation-type dovetail groove sliding stage that enables an easy-to-operate and compact structure, by solving such problems and making a driving means simpler.

Solution to Problem

In order to achieve the above-mentioned object, the present invention provides a slide operation-type dovetail groove sliding stage for performing positional adjustment of a precision apparatus by fitting a trapezoidally-projecting dovetail into a trapezoidally-recessed dovetail groove to slide a sliding component with respect to a fixed component, and performing an operation of sliding the sliding component with a driving means. The slide operation-type dovetail groove sliding stage is characterized in that it comprises a sliding lock screw for locking sliding of the sliding component by causing the screw to abut on an inverted triangle-shaped protrusion, provided on a sidewall of the fixed component approximately parallel to a sliding direction and coupled to the fixed component, to bring the protrusion into contact with a dovetail of the sliding component and by tightening the screw; and in that the sliding lock screw is used as a sliding adjustment screw for performing fine adjustment of a degree of sliding of the sliding component with respect to the fixed component by adjusting an amount of rotation of the screw abutting on the inverted triangle-shaped protrusion to bring it into contact with the dovetail of the sliding component, and a driving means which an operator grasps to perform an operation of sliding the sliding component to a desired position. This enables the operator to integrate all of functions to lock sliding of the sliding component, to adjust the degree of sliding of the sliding component, and to perform the operation of sliding the sliding component into the sliding lock screw. For example, operability can be improved so that locking of a sliding component is released and the degree of sliding of the sliding component is finely adjusted before the sliding component can be continuously moved quickly or finely with a same sliding lock screw.

In order to achieve the above-mentioned object, the present invention provides a slide operation-type dovetail groove sliding stage for performing positional adjustment of a precision apparatus by fitting a trapezoidally-projecting dovetail into a trapezoidally-recessed dovetail groove to slide a sliding component with respect to a fixed component, and performing an operation of sliding the sliding component with a driving means. The slide operation-type dovetail groove sliding stage is characterized in that it comprises a sliding lock screw for locking sliding of the sliding component, by causing the screw to abut on an inverted triangle-shaped protrusion, provided on a sidewall of the fixed component approximately parallel to a sliding direction and coupled to the fixed component, to bring the protrusion into contact with a dovetail of the sliding component and by tightening it with the lever, and a driving means which is provided on a sidewall of the sliding component approximately parallel to the sliding direction and which an operator grasps to perform an operation of sliding the sliding component to a desired position. This enables the dovetail groove sliding stage to be driven by a simple driving means with the control knob omitted, even when the lever-type sliding lock screw is used.

In order to achieve the above-mentioned object, the present invention provides a slide operation-type dovetail groove sliding stage for performing positional adjustment of a precision apparatus by fitting a trapezoidally-projecting dovetail into a trapezoidally-recessed dovetail groove, engaging a rack fixed to a sliding component with a pinion gear supported by a fixed component to drive them, and sliding the sliding component with respect to the fixed component. The slide operation-type dovetail groove sliding stage is characterized in that it comprises a pressure control screw for adjusting a degree of pressurization of the rack and the pinion gear with contact friction by holding down the pinion gear, and a driving means which is provided on a sidewall of the sliding component approximately parallel to a sliding direction and which an operator grasps to perform an operation of sliding the sliding component to a desired position. This enables the slide operation-type dovetail groove sliding stage of the rack-and-pinion-type to be driven by a simple driving means with the control knob omitted. In addition, equipped with the rack and the pinion gear, the dovetail groove sliding stage can be provided with the pressure control screw capable of adjusting pressurization of the rack and the pinion gear, thereby being able to improve its operability.

With the configurations of the three embodiments described above, the slide operation-type dovetail groove sliding stage can eliminate the control knob, which has been an essential driving means for the conventional rack-and-pinion-type dovetail groove sliding stage or the feed-screw-type dovetail groove sliding stage. Also, elimination of the complicated mechanism, in which one of a pair of engaged driving means consisting of a rack and a pinion or a female-threaded cylinder and a male-threaded rod is rotated by the control knob to cause the other to travel straight, thereby sliding the sliding component, has enabled sliding of the dovetail groove sliding stage with a simple mechanism. Also, operability improves since an operator can release locking of the sliding component and instantly slide the sliding component with his/her fingers to a desired position. Furthermore, elimination of the control knob can reduce height of the dovetail groove sliding stage, thus making the stage more compact and lightweight.

It is also preferable that, in a slide operation-type dovetail groove sliding stage, a driving means is a force application rod which is removably attached to the sliding component and which an operator grasps to perform an operation of sliding a sliding component to a desired position. This enables the operator to directly perform the operation of sliding the dovetail groove sliding stage by the easy-to-grasp force application rod and can improve operability of the dovetail groove sliding stage.

It is also preferable that the slide operation-type dovetail groove sliding stage further comprises a reaction force rod which is removably attached to a fixed component and takes reaction force with other fingers of the operator when he/she performs an operation of sliding a sliding component to a desired position with a force application rod. This enables the operator to use the force application rod and the reaction force rod as a pair of operation instruments, which can work well, for example, when the sliding component must be widely moved through application of force, when the sliding component must be adjusted through delicate modification of force, and the like.

It is also preferable that, in the slide operation-type dovetail groove sliding stage, tap holes, into or from which a reaction force rod can be inserted or removed, are provided on plural positions of a fixed component on a sidewall approximately parallel or orthogonal to a sliding direction. This enables the operator to arbitrarily set a position of the reaction force rod, depending on operation of the dovetail groove sliding stage, to a fixed component on the side of a side surface approximately parallel to a sliding direction or a fixed component on the side of a side surface approximately orthogonal to the sliding direction. Also, more than one position of the reaction force rod can be set, which can thus improve operability of the dovetail groove sliding stage.

It is also preferable that, in the slide operation-type dovetail groove sliding stage, a driving means is an antislip rubber removably provided on a sidewall of a sliding component approximately parallel to a sliding direction and which an operator grasps to perform an operation of sliding the sliding component to a desired position. This enables the operator to directly perform the operation of sliding the dovetail groove sliding stage by sandwiching and grasping the antislip rubber, thus improving operability of the dovetail groove sliding stage.

It is also preferable that, in a slide operation-type dovetail groove sliding stage, antislip rubbers are attached, as a pair, to right and left sidewalls of a sliding component. This enables the sliding component to be firmly held without slipping, thus improving operability of the dovetail groove sliding stage.

Furthermore, it is preferable that, in a slide operation-type dovetail groove sliding stage, a pair of scale seals are attached to mutually adjacent sidewalls of a fixed component and a sliding component, which are approximately parallel to a sliding direction. This enables a simple configuration by attaching and fixing scale seals, rather than fixing scale plates by pins as has been usually done.

As described above, the present invention can provide a slide operation-type dovetail groove sliding stage which enables an easy-to-operate and compact structure by making a driving means simpler.

DESCRIPTION OF EMBODIMENTS

Figure 1:
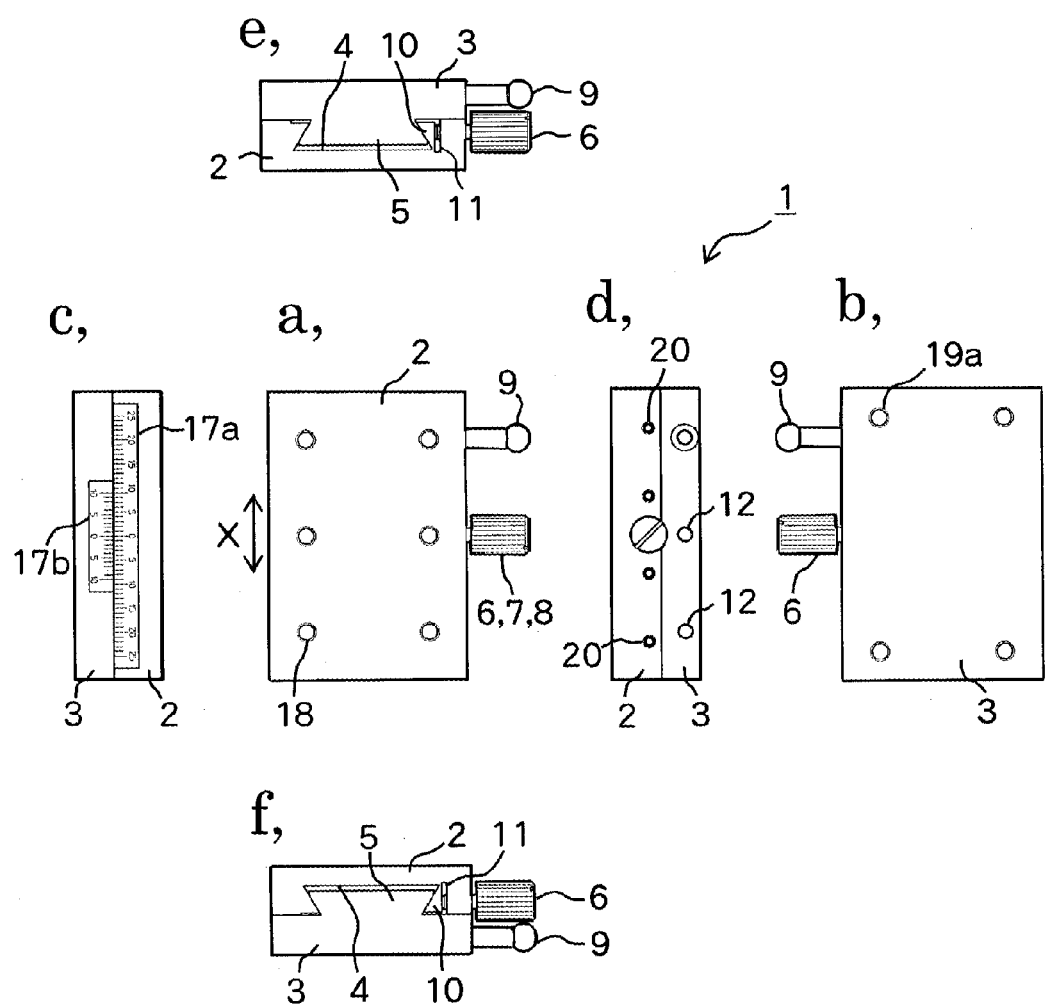
FIGS. 1(a)-1(f) show one embodiment of a slide operation-type dovetail groove sliding stage according to the present invention, in a plan view (FIG. 1(a)), a bottom view (FIG. 1(b)), a left lateral view (FIG. 1(c)), a right lateral view (FIG. 1(d)), a front view (FIG. 1(e)), and a rear view (FIG. 1(f)).

Embodiments of a slide operation-type dovetail groove sliding stage 1 according to the present invention will be described hereinafter in detail with reference to the drawings. As a conventional dovetail groove sliding stage, a rack-and-pinion-type dovetail groove sliding stage which uses a rack and a pinion gear as a driving means and a feed-screw-type dovetail groove sliding stage which uses a male-threaded rod and a female-threaded cylinder as a driving means are common. The rack-and-pinion-type dovetail groove sliding stage performs positional adjustment of a precision apparatus by rotating the pinion gear with a control knob to cause the rack to travel straight, thereby sliding a sliding component. Also, the feed-screw-type dovetail groove sliding stage performs positional adjustment of a precision apparatus by rotating the male-threaded rod with the control knob to cause the female-threaded cylinder to travel straight, thereby sliding the sliding component. Thus, for the rack-and-pinion-type dovetail groove sliding stage and the feed-screw-type dovetail groove sliding stage, the control knob is an essential component as a driving means.

However, in the slide operation-type dovetail groove sliding stage 1 according to the present invention, the control knob is excluded from the components, a trapezoidally-projecting dovetail 5 is fitted into a trapezoidally-recessed dovetail groove 4, and, as described below, a sliding component 2 is caused to slide with respect to a fixed component 3 through a manual sliding operation by using a driving means such as a force application rod, a reaction force rod, or an antislip rubber. Specifically, while rotational movement of the control knob is converted to translatory movement of the sliding component 2 with respect to the fixed component 3 in the conventional dovetail groove sliding stage, the translatory movement of the sliding component 2 with respect to the fixed component 3 is directly generated by the manual sliding operation in the slide operation-type dovetail groove sliding stage 1 according to the present invention. Specific embodiments and modified examples of the driving means will be described hereinafter.

(First Embodiment)

FIGS. 1(a) to 1(f) show a first embodiment of the slide operation-type dovetail groove sliding stage 1 according to the present invention in a plan view (FIG. 1(a)), a bottom view (FIG. 1(b)), a left lateral view (FIG. 1(c)), a right lateral view (FIG. 1(d)), a front view (FIG. 1(e)), and a rear view (FIG. 1(f)). The slide operation-type dovetail groove sliding stage 1 consists of a sliding component 2 and a fixed component 3, and fits a trapezoidally-projecting dovetail 5 into a trapezoidally-recessed dovetail groove 4 to slide the sliding component 2 with respect to the fixed component 3. In this manner, by fitting the dovetail 5 into the dovetail groove 4 with precision, the sliding component 2 slides with respect to the fixed component 3 linearly and smoothly.

Then, amounts of displacement of the sliding component 2 with respect to the fixed component 3 can be read with a scale seal 17a attached to a sidewall (FIG. 1(c)) of the sliding component 2 and a scale seal 17b attached to a sidewall (FIG. 1(c)) of the fixed component 3. The scale seals 17a, 17b having the scales printed thereon are attached to the sidewalls of the sliding component 2 and the fixed component 3. Conventionally, scale plates on which the scales are printed are secured by screws on the sidewalls (FIG. 1(c)) of the sliding component 2 and the fixed component 3. However, fixedly attaching the scale seals 17a, 17b enables a simple configuration.

As shown in FIG. 1(a), holes 18 for mounting a precision apparatus are provided on a plane surface of the sliding component and a precision apparatus (not shown) is fixed thereto. Furthermore, as shown in FIG. 1(b), a hole 19a for fixedly fastening to a base is provided on a bottom face of the fixed component 3, and the slide operation-type dovetail groove sliding stage 1 is fastened to the base (not shown). In this manner, positional adjustment of the precision apparatus can be performed through the operation of sliding the sliding component, to which the precision apparatus is secured, with respect to the fixed component 3 fixed to the base.

FIG. 1(e) and FIG. 1(f) show a sliding lock screw 6. The sliding lock screw 6 is provided on a sidewall (FIG. 1(d)) of the sliding component 2 approximately parallel to a sliding direction. Then, a tip of the sliding lock screw 6 abuts on an inverted triangle-shaped protrusion 10 coupled to the fixed component 3, thereby bringing the protrusion into contact with a dovetail 5 of the sliding component 2. Then, tightening of the sliding lock screw 6 locks sliding of the sliding component 2. Note that cutting of a groove 11 between the protrusion 10 and the fixed component 3 makes the protrusion 10 an easily flexing inverted triangle. While the sliding lock screw 6 includes a handscrew type, a lever type, and the like depending on its configuration, in the embodiment, the handscrew-type sliding lock screw 6, as shown in FIG. 1(e) and FIG. 1(f), is used. The handscrew-type sliding lock screw 6 can also be used as a sliding adjustment screw 7 for performing fine adjustment of a degree of sliding of the sliding component 2 with respect to the fixed component 3 by adjusting an amount of rotation of the sliding lock screw 6 that abuts on the inverted triangle-shaped protrusion 10 to bring it into contact with the dovetail 5 of the sliding component 2. This enables an operator to integrate into the sliding lock screw 6 functions to lock sliding of the sliding component 2, and to adjust the degree of sliding of the sliding component 2. For example, locking of the sliding component 2 can be released before the operator can continuously perform fine adjustment of the degree of sliding of the sliding component 2 for the same sliding lock screw 6. However, holes 20 for sliding adjustment may also be provided on the sidewall (FIG. 1(d)) of the sliding component 2 approximately parallel to the sliding direction. Sliding adjustment screws 7 (not shown) may be fixed to the holes 20 for sliding adjustment and share the function of the sliding lock screw 6.

Furthermore, the operator can use the sliding lock screw 6 also as a force application rod 8, which is a driving means for grasping the sliding component 2 to slide it to a desired position. This enables the operator to integrate into the sliding lock screw 6 all of functions to lock sliding of the sliding component 2, to adjust the degree of sliding of the sliding component 2, and to perform the operation of grasping and sliding the sliding component 2. For example, locking of the sliding component 2 can be released and the degree of sliding of the sliding component 2 is finely adjusted before the sliding component 2 can be continuously moved quickly or finely with a same sliding lock screw 6. Note that the force application rod 8 is removable and can be removed if it is not needed.

Furthermore, the slide operation-type dovetail groove sliding stage 1 comprises a reaction force rod 9 which is removably attached to the fixed component 3 and takes reaction force with other fingers of the operator when he/she performs the operation of sliding the sliding component 2 to a desired position by using the sliding lock screw 6 as the force application rod 8. This enables the operator to use as a pair of operation instruments the sliding lock screw 6 to be used as the force application rod 8 and the reaction force rod 9, which works well, for example, when the sliding component 2 must be widely moved through application of force, when the sliding component 2 must be adjusted through delicate modification of force, and the like. Also, tapped holes 12 for reaction force rod to which the reaction force rod 9 can be fixed are provided on the sidewall (FIG. 1(d)) of the fixed component 3 approximately parallel to the sliding direction. In this manner, a position to fix the reaction force rod 9 can be selected and it is also possible to fix the reaction force rod 9 at plural positions. Note that the reaction force rod 9 is removable similar to the force application rod 8 and can be removed if it is not needed.

(Second Embodiment)

Figure 2:
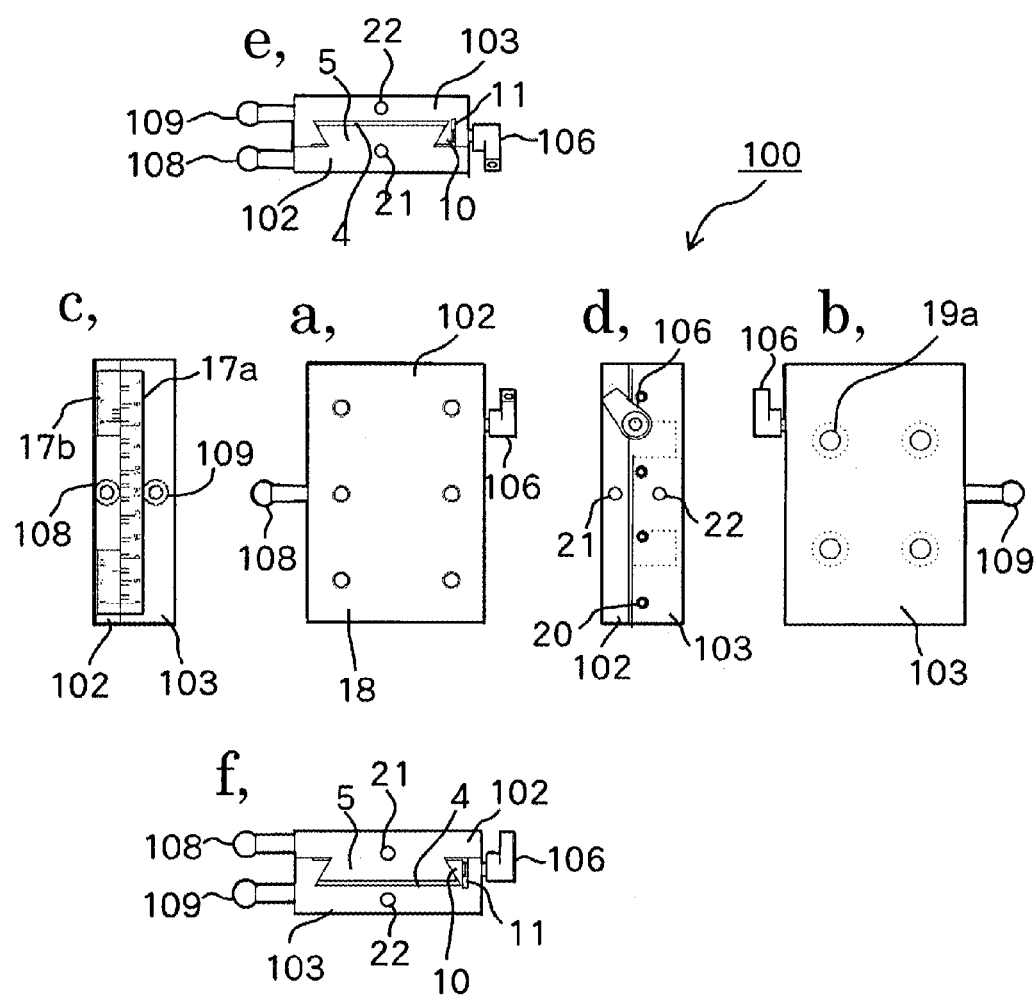
FIGS. 2(a)-2(f) show other embodiment of the slide operation-type dovetail groove sliding stage, in a plan view (FIG. 2(a)), a bottom view (FIG. 2(b)), a left lateral view (FIG. 2(c)), a right lateral view (FIG. 2(d)), a front view (FIG. 2(e)), and a rear view (FIG. 2(f)).

FIGS. 2(a)-2(f) show a second embodiment of a slide operation-type dovetail groove sliding stage 100 according to the present invention in a plan view (FIG. 2(a)), a bottom view (FIG. 2(b)), a left lateral view (FIG. 2(c)), a right lateral view (FIG. 2(d)), a front view (FIG. 2(e)), and a rear view (FIG. 2(f)). FIGS. 2(e) and 2(f) show a sliding lock screw 106. The sliding lock screw 106 is provided on a sidewall (FIG. 2(d)) of a fixed component 103 approximately parallel to a sliding direction. Then, the sliding lock screw 106 abuts on an inverted triangle-shaped protrusion 10 coupled to the fixed component 103, thereby bringing it into contact with a dovetail 5 of a sliding component 102. Tightening of the sliding lock screw 6 locks sliding of the sliding component 102. Note that cutting of a groove 11 between the protrusion 10 and the fixed component 103 makes the protrusion 10 an easily flexing inverted triangle. While the sliding lock screw 106 includes a handscrew type, a lever type and the like depending on its configuration, in the embodiment, the lever-type sliding lock screw 106, as shown in FIGS. 2(e) and 2(f), is used. Also, as shown in FIG. 2(a), holes 18 for mounting a precision apparatus are provided on a plane surface of the sliding component 102 and a precision apparatus (not shown) is fixed thereto. Also, as shown in FIG. 2(b), a hole 19a for fixedly fastening to a base is provided on a bottom face of the fixed component 103. Also, amounts of displacement of the sliding component 102 with respect to the fixed component 103 can be read with a scale seal 17a attached to a sidewall (FIG. 2(c)) of the fixed component 103 and a scale seal 17b attached to the sidewall (FIG. 2(c)) of the sliding component 102.

Also, to the sidewall (FIG. 2(c)) of the sliding component 102 approximately parallel to the sliding direction is fixed a force application rod 108, which is a driving means which an operator grasps to slide the sliding component 102 to a desired position. Furthermore, to the fixed component 103 on the side of the side surface (FIG. 2(c)) approximately parallel to the sliding direction is fixed a reaction force rod 109 which takes reaction force with other fingers of the operator when he/she performs the operation of sliding the sliding component 102 to a desired position, with the force application rod 108. The force application rod 108 and the reaction force rod 109 enable the operator to perform the operation of easily sliding the sliding component 102 to a desired position. Also, a tapped hole 21 for force application rod to which the force application rod 108 can be fixed is provided on the sidewall (FIG. 2(d)) of the sliding component 102 approximately parallel to the sliding direction, and a tapped hole 21 for force application rod to which the force application rod 108 can be fixed is provided on the sidewall (FIGS. 2(e) and 2(f)) of the sliding component 102 approximately orthogonal to the sliding direction. Similarly, a tapped hole 22 for reaction force rod to which the reaction force rod 109 can be fixed is provided on the sidewall (FIG. 2(d)) of the fixed component 103 approximately parallel to the sliding direction, and a tapped hole 22 for reaction force rod to which the reaction force rod 109 can be fixed is provided on the sidewall (FIGS. 2(e) and 2(f)) of the fixed component 103 approximately orthogonal to the sliding direction. In this manner, the force application rod 108 and the reaction force rod 109 can be fixed at plural positions on the sidewalls of the sliding component 102 and the fixed component 103, respectively. Note that the force application rods 108 can be removably fixed to the tapped holes 21 for force application rod. The reaction force rods 109 can also be removably fixed to the tapped holes 22 for reaction force rod. Thus, they can be removed if they are not needed. Furthermore, holes 20 for sliding adjustment are provided on the sidewall (FIG. 2(d)) of the sliding component 102 approximately parallel to the sliding direction, and sliding adjustment screws may be fixed thereto.

(Third Embodiment)

Figure 3:
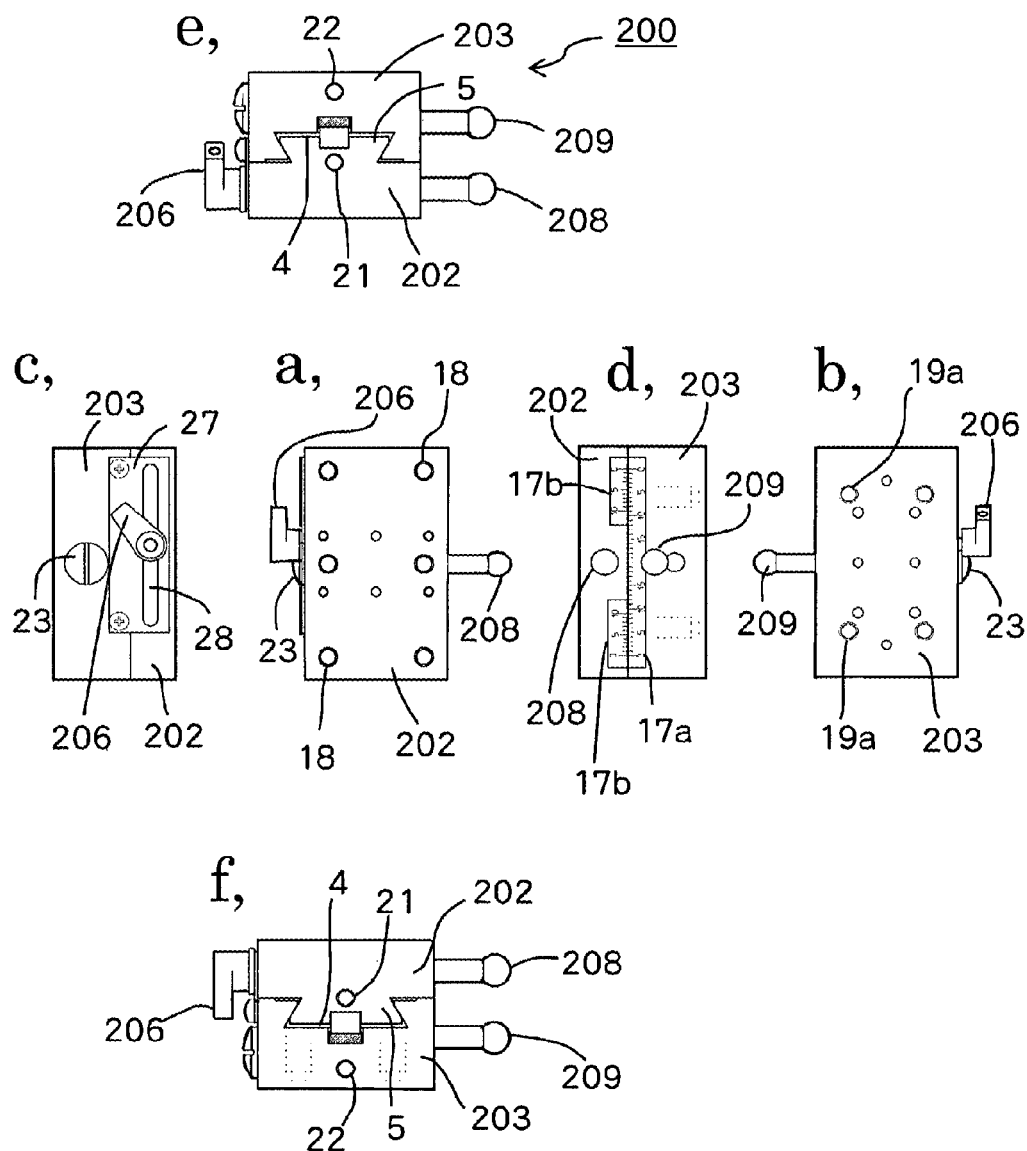
FIGS. 3(a)-3(f) show other embodiment of the slide operation-type dovetail groove sliding stage, in a plan view (FIG. 3(a)), a bottom view (FIG. 3(b)), a left lateral view (FIG. 3(c)), a right lateral view (FIG. 3(d)), a front view (FIG. 3(e)), and a rear view (FIG. 3(f)).

FIGS. 3(a)-3(f) show a third embodiment of a slide operation-type dovetail groove sliding stage 200 according to the present invention in a plan view (FIG. 3(a)), a bottom view (FIG. 3(b)), a left lateral view (FIG. 3(c)), a right lateral view (FIG. 3(d)), a front view (FIG. 3(e)), and a rear view (FIG. 3(f)). In the embodiment, positional adjustment of a precision apparatus is performed by engaging a rack fixed to a sliding component 202 with a pinion gear supported by a fixed component 203 to drive them, and sliding the sliding component 202 with respect to the fixed component 203. The slide operation-type dovetail groove sliding stage 200 comprises a pressure control screw 23 for adjusting a degree of pressurization of the rack and the pinion gear by holding down the pinion gear and using contact friction. The pressure control screw 23 enables adjustment of a degree of a sliding operation by a mechanism different from a sliding adjustment screw.

FIGS. 3(e) and 3(f) show a sliding lock screw 206. The sliding lock screw 206 is provided on a sidewall (FIG. 3(c)) of the sliding component 202 approximately parallel to a sliding direction. While the sliding lock screw 306 includes a hand-screw type, a lever type and the like depending on its configuration, in the embodiment, the lever-type sliding lock screw 306, as shown in FIGS. 3(e) and 3(f), is used. In the embodiment, the sliding lock screw 206 is used with a presser bar 27 (FIG. 3(c)) secured to the fixed component 203 to lock movement of the sliding component 202 with respect to the fixed component 203. Specifically, the sliding lock screw 206 is inserted into an opening 28 created in the presser bar 27. Then, tightening of the sliding lock screw 106 presses the presser bar 27 against the sliding component 202, thus frictional force fixing the sliding component 202 to that position with respect to the fixed component 203. Thus, no inverted triangle-shaped protrusion coupled to the fixed component 103 is provided in the embodiment.

As shown in FIG. 3(a), holes 18 for mounting a precision apparatus are provided on a plane surface of the sliding component 202 and a precision apparatus (not shown) is fixed thereto. Furthermore, referring to FIG. 3(b), holes 19a for fixedly fastening to a base are provided on a bottom face of the fixed component 203. In addition, amounts of displacement of the sliding component 202 with respect to the fixed component 203 can be read with a scale seal 17a attached to a sidewall (FIG. 3(d)) of the fixed component 203 and a scale seal 17b attached to the sidewall (FIG. 3(d)) of the sliding component 202.

To the sidewall (FIG. 2(c)) of the sliding component 202 approximately parallel to the sliding direction is fixed a force application rod 208 which is a driving means which an operator grasps to slide the sliding component 202 to a desired position. Furthermore, to the fixed component 203 on the side of the side surface approximately parallel to the sliding direction is fixed a reaction force rod 209 which takes reaction force by other fingers of the operator when he/she performs the operation of sliding the sliding component 202 to a desired position, with the force application rod 208. The force application rod 208 and the reaction force rod 209 enable the operator to perform the operation of easily sliding the sliding component 202 to a desired position. Also, a tapped hole 21 for force application rod to which the force application rod 208 can be fixed is provided on the sidewall (FIG. 3(e), 3(f)) of the sliding component 202 approximately orthogonal to the sliding direction. Similarly, a tapped hole 22 for reaction force rod to which the reaction force rod 209 can be fixed is provided on the sidewall (FIG. 3(e), 3(f)) of the fixed component 203 approximately orthogonal to the sliding direction. In this manner, the force application rod 208 and the reaction force rod 209 can be fixed at more than one position on the sidewalls of the sliding component 202 and the fixed component 203, respectively. Note that the force application rods 208 can be removably fixed to the tapped holes 21 for force application rod. The reaction force rods 209 can also be removably fixed to the tapped holes 22 for reaction force rod. Thus, they can be removed if they are not needed.

(Fourth Embodiment)

Figure 4:
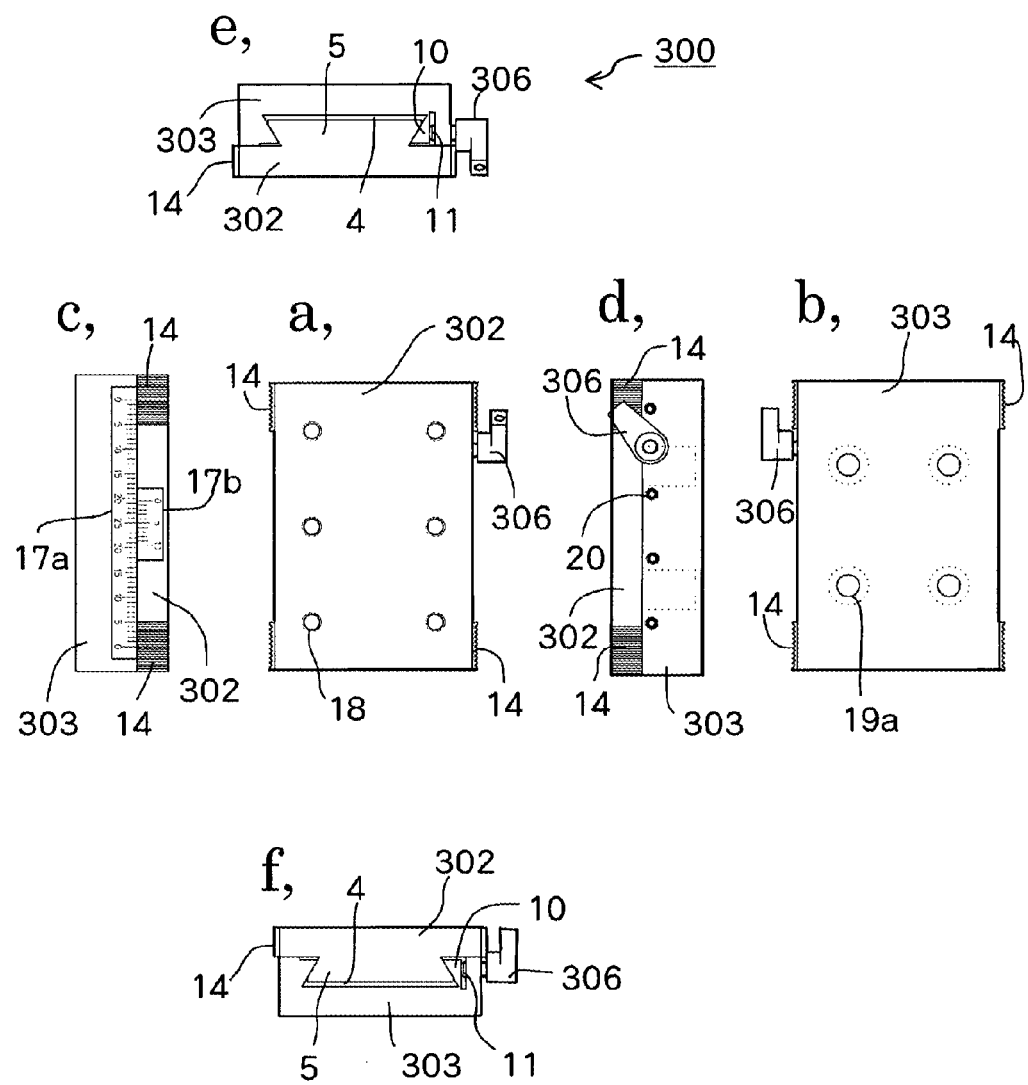
FIGS. 4(a)-4(f) is a plan view showing an embodiment of the slide operation-type dovetail groove sliding stage using antislip rubbers, in a plan view (FIG. 4(a)), a bottom view (FIG. 4(b)), a left lateral view (FIG. 4(c)), a right lateral view (FIG. 4(d)), a front view (FIG. 4(e)), and a rear view (FIG. 4(f)).

FIGS. 4(a)-4(f) show a fourth embodiment of a slide operation-type dovetail groove sliding stage 300 according to the present invention in a plan view (FIG. 4(a)), a bottom view (FIG. 4(b)), a left lateral view (FIG. 4(c)), a right lateral view (FIG. 4(d)), a front view (FIG. 4(e)), and a rear view (FIG. 4(f)). Although the embodiment has a driving means which differs from that of the second embodiment, components other than the driving means are similar, and thus a description thereof will be omitted. The driving means of the embodiment is antislip rubbers 14 which are provided on the sidewall of the sliding component 302 approximately parallel to the sliding direction and slide the sliding component 302 to a desired position when the operator grasps the means. This enables the sliding component 302 to be firmly held without slipping, thus improving operability of the dovetail groove sliding stage. In addition, the antislip rubbers 14 are attached as a pair to the right and left sidewalls of a sliding component. This enables the operator to firmly hold the sliding component 302 by sandwiching and grasping a pair of the antislip rubbers 14. Note that the antislip rubbers 14 can also be used as a driving means in the first embodiment described above. Furthermore, holes 20 for sliding adjustment are provided on the sidewall (FIG. 4(d)) of the sliding component 302 approximately parallel to the sliding direction, and sliding adjustment screws may be fixed thereto.

EXAMPLE 1

Figure 5:
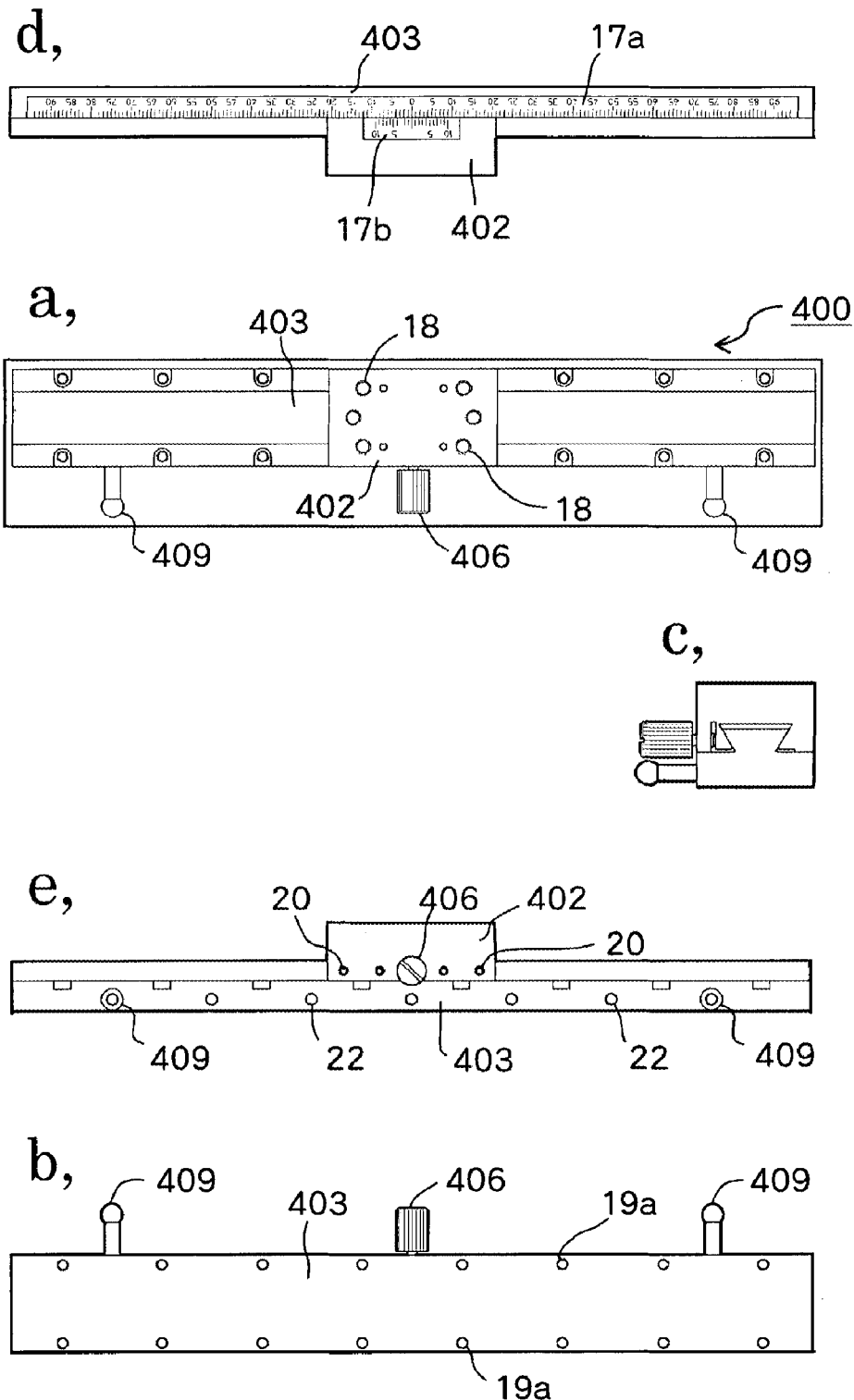
FIGS. 5(a)-5(e) show an example of the long slide operation-type dovetail groove sliding stage, in a plan view (FIG. 5(a)), a bottom view (FIG. 5(b)), a right lateral view (FIG. 5(c)), a front view (FIG. 5(d)), and a rear view (FIG. 5(e)).

FIGS. 5(a)-5(e) show an example of a long slide operation-type dovetail groove sliding stage 400 in a plan view (FIG. 5(a)), a bottom view (FIG. 5(b)), a right lateral view (FIG. 5(c)), a front view (FIG. 5(d)), and a rear view (FIG. 5(e)). The example is a variation of the first embodiment described above. Specifically, it is a case of a dovetail groove sliding stage in which a fixed component 403 is long, and thus a travel distance of a sliding component 402 is long. An operator can integrate into a sliding lock screw 406 all of functions to lock sliding of the sliding component 402, to adjust a degree of sliding of the sliding component 402, and to perform an operation of grasping and sliding the sliding component 402. The operator can also perform the sliding operation by using the sliding lock screw 406 to be used as a force application rod and a reaction force rod 409, as a pair of operation instruments.

EXAMPLE 2

Figure 6:
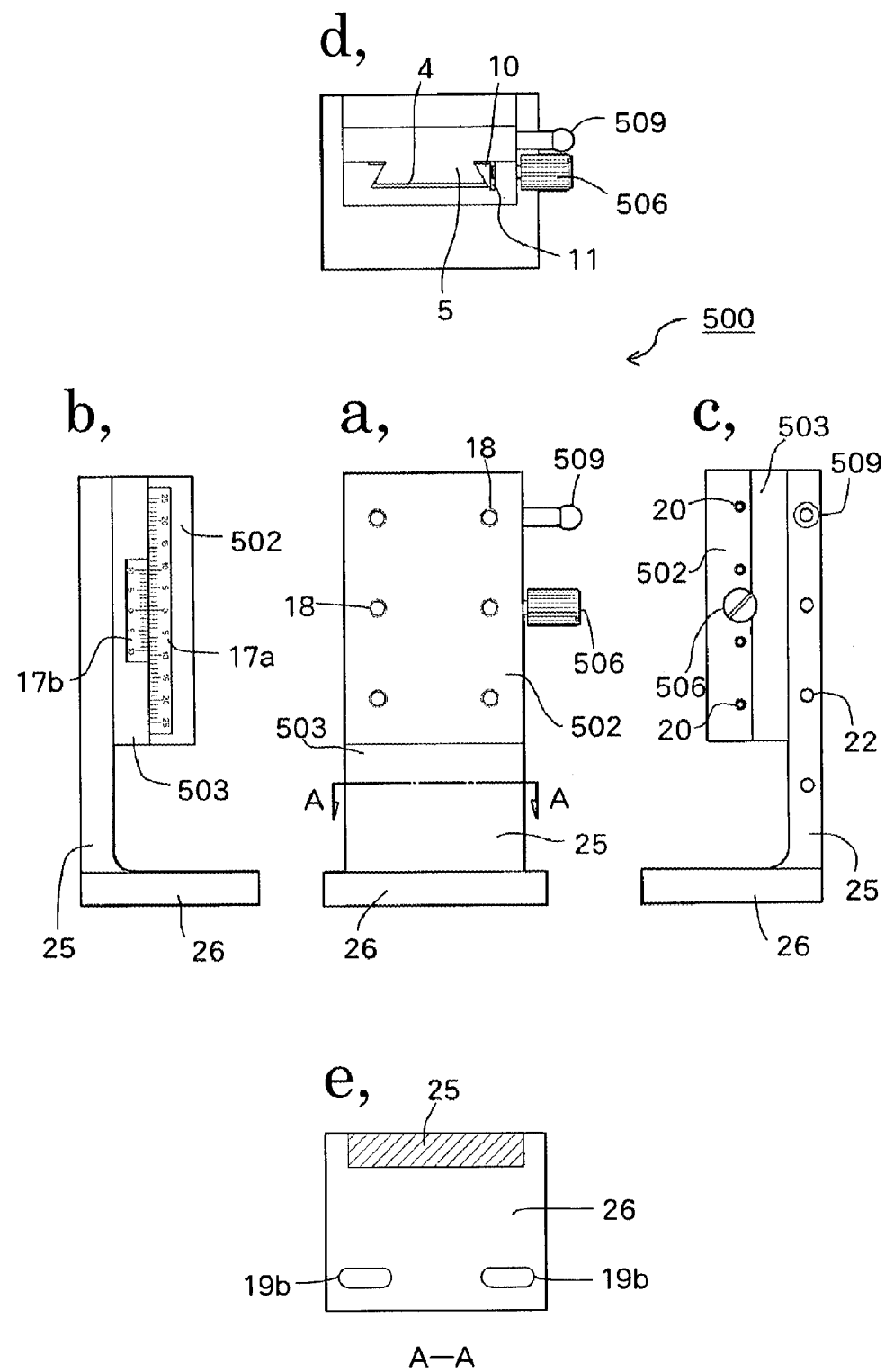
FIGS. 6(a)-6(e) show an example of a Z-axis sliding stage that slides a slide operation-type dovetail groove sliding stage to a height direction (Z direction), in a plan view (FIG. 6(a)), a left lateral view (FIG. 6(b)), a right lateral view (FIG. 6(c)), a front view (FIG. 6(d)), and a rear view (FIG. 6(e)).

FIGS. 6(*a*)-6(*e*) show an example of a Z-axis sliding stage for sliding a slide operation-type dovetail groove sliding stage 500 in a height direction (Z direction) in a plan view (FIG. 6(*a*)), a left lateral view (FIG. 6(*b*)), a right lateral view (FIG. 6(*c*)), a front view (FIG. 6(*d*)), and a rear view (FIG. 6(*e*)). The example is a variation of the first embodiment, and is a case of a dovetail groove sliding stage in which a fixed component 503 is long and a travel distance of a sliding component 502 is long. An operator can integrate into a sliding lock screw 506 all of functions to lock sliding of the sliding component 502, to adjust a degree of sliding of the sliding component 502, and to perform an operation of grasping and sliding the sliding component 502. The operator can also perform the sliding operation by using the sliding lock screw 506 to be used as a force application rod and a reaction force rod 509, as a pair of operation instruments.

EXAMPLE 3

Figure 7:
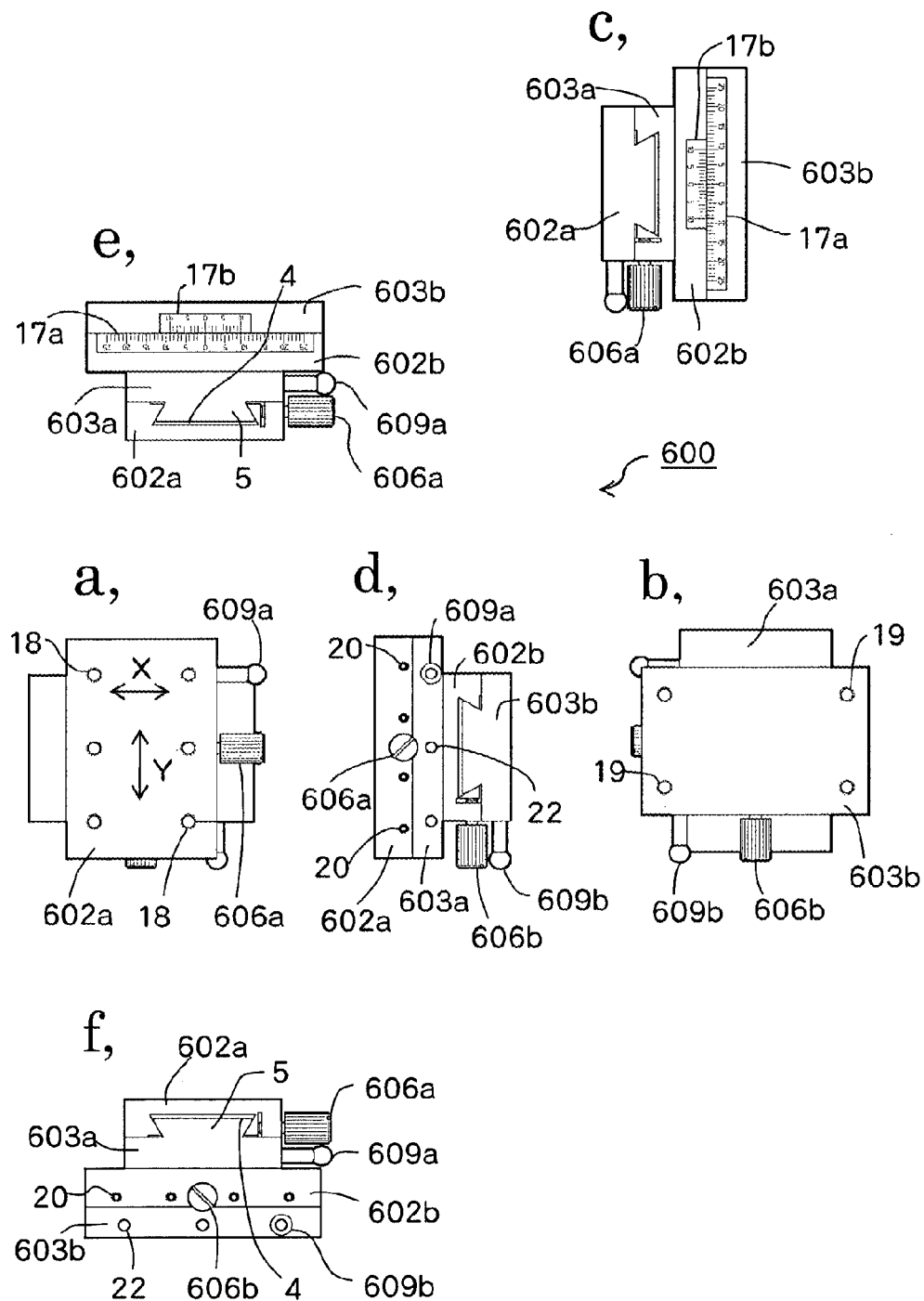
FIGS. 7(a)-7(f) show an example of an XY-axis stage made by coupling two slide operation-type dovetail groove sliding stages to intersecting directions (X direction and Y direction), in a plan view (FIG. 7(a)), a bottom view (FIG. 7(b)), a left lateral view (FIG. 7(c)), a right lateral view (FIG. 7(d)), a front view (FIG. 7(e)), and a rear view (FIG. 7(f)).

FIGS. 7(*a*)-7(*f*) show an example of an X-Y axis stage made by coupling two slide operation-type dovetail groove sliding stages 600 in intersecting directions (X direction and Y direction) in a plan view (FIG. 7(*a*)), a bottom view (FIG. 7(*b*)), a left lateral view (FIG. 7(*c*)), a right lateral view (FIG. 7(*d*)), a front view (FIG. 7(*e*)), and a rear view (FIG. 7(*f*)). The example is a variation of the first embodiment described above. Specifically, two slide operation-type dovetail groove sliding stages 1 of the first embodiment are prepared and coupled in a vertical direction, so that they face the intersecting X-axis direction and Y-axis direction. An operator can integrate into a sliding lock screw 606 all of functions to lock sliding of a sliding component 602, adjust a degree of sliding of the sliding component 602, and perform an operation of grasping and sliding the sliding component 602. The operator can also perform the sliding operation by using the sliding lock screw 606 to be used as a force application rod and a reaction force rod 609, as a pair of operation instruments.

Reference Numerals

1, 100, 200, 300, 400, 500, 600 Slide operation-type dovetail groove sliding stages
2, 102, 202, 302, 402, 502, 602*a*, 602*b* Sliding component
3, 103, 203, 303, 403, 503, 603 Fixed component
4 Dovetail groove
5 Dovetail
6, 106, 206, 306, 406, 506, 606*a* (handscrew-type) Sliding lock screw, 606*b* (lever-type) Sliding lock screw
7 Sliding adjustment screws
8, 108, 208, 308, 408, 508, 608 Force application rod
9, 109, 209, 309, 409, 509, 609*a*, 609*b* Reaction force rod
10 Protrusion
11 Groove
12 Tapped hole
14 Antislip rubber
17*a*, 17*b* Scale seal
18 Hole for mounting a precision apparatus
19*a*, 19*b* Hole for fixedly fastening to a base
20 Hole for sliding adjustment
21 Tapped hole for force application rod
22 Tapped hole for reaction force rod
23 Pressure control screw
25 Supporting strut
26 Supporting base
27 Presser bar
28 Opening

The invention claimed is:

1. A slide operation-type dovetail groove sliding stage for performing positional adjustment of a precision apparatus by fitting a trapezoidally-projecting dovetail into a trapezoidally-recessed dovetail groove to slide a sliding component with respect to a fixed component, and performing an operation of sliding the sliding component with a driving means, characterized in that:

the slide operation-type dovetail groove sliding stage comprises a sliding lock screw for locking sliding of the sliding component by causing the screw to abut on an inverted triangle-shaped protrusion, provided on a sidewall of the sliding component approximately parallel to a sliding direction and coupled to the sliding component, to bring the protrusion into contact with a dovetail of the fixed component, and by tightening the screw;

the sliding lock screw is used as a sliding adjustment screw for performing fine adjustment of a degree of sliding of the sliding component with respect to the fixed component by adjusting an amount of rotation of the screw abutting on the inverted triangle-shaped protrusion to bring it into contact with the dovetail of the sliding component, and a force application rod which an operator grasps to perform an operation of sliding the sliding component to a desired position; and the slide operation-type dovetail groove sliding stage further comprises a reaction force rod which is removably attached to the fixed component and takes reaction force with other fingers of the operator when he/she performs the operation of sliding the sliding component to a desired position, with the force application rod.

2. The slide operation-type dovetail groove sliding stage according to claim 1, characterized in that:

a pair of scale seals are attached to mutually adjacent sidewalls of the fixed component and the sliding component, which are approximately parallel to the sliding direction.

3. A slide operation-type dovetail groove sliding stage for performing positional adjustment of a precision apparatus by fitting a trapezoidally-projecting dovetail into a trapezoidally-recessed dovetail groove to slide a sliding component with respect to a fixed component, and performing an operation of sliding the sliding component with a driving means, characterized in that:

the slide operation-type dovetail groove sliding stage comprises a sliding lock screw for locking sliding of the sliding component by causing the screw to abut on an inverted triangle-shaped protrusion, provided on a sidewall of the fixed component approximately parallel to a sliding direction and coupled to the fixed component, to bring the protrusion into contact with a dovetail of the sliding component, and by tightening it with a lever;

the slide operation-type dovetail groove sliding stage comprises a driving means which is provided on a sidewall of the sliding component approximately parallel to the sliding direction and which an operator grasps to perform an operation of sliding the sliding component to a desired position;

the driving means is a force application rod which is removably attached to the sliding component and which the operator grasps to perform the operation of sliding the sliding component to a desired position; and the slide operation-type dovetail groove sliding stage further comprises a reaction force rod which is removably attached to the fixed component and takes reaction force with other fingers of the operator when he/she performs the operation of sliding the sliding component to a desired position, with the force application rod.

4. The slide operation-type dovetail groove sliding stage according to claim 3, characterized in that:
tapped holes, into or from which the force application rod or the reaction force rod can be inserted or removed, are provided on plural positions of the fixed component on the side of a side surface approximately parallel to the sliding direction.

5. The slide operation-type dovetail groove sliding stage according to claim 3, characterized in that:
tapped holes, into or from which the force application rod or the reaction force rod can be inserted or removed, are provided on plural positions of the fixed component on the sidewall approximately orthogonal to the sliding direction.

6. A slide operation-type dovetail groove sliding stage for performing positional adjustment of a precision apparatus by fitting a trapezoidally-projecting dovetail into a trapezoidally-recessed dovetail groove, engaging a rack fixed to a sliding component with a pinion gear supported by a fixed component to drive them, and sliding the sliding component with respect to the fixed component, characterized in that:
the slide operation-type dovetail groove sliding stage comprises a pressure control screw for adjusting a degree of pressurization of the rack and the pinion gear with contact friction by holding down the pinion gear;
the slide operation-type dovetail groove sliding stage comprises a driving means which is provided on a sidewall of the sliding component approximately parallel to a sliding direction and which an operator grasps to perform an operation of sliding the sliding component to a desired position;
the driving means is a force application rod which is removably attached to the sliding component and which the operator grasps to perform the operation of sliding the sliding component to a desired position; and
the slide operation-type dovetail groove sliding stage further comprises a reaction force rod which is removably attached to the fixed component and takes reaction force with other fingers of the operator when he/she performs the operation of sliding the sliding component to a desired position, with the force application rod.

7. A slide operation-type dovetail groove sliding stage for performing positional adjustment of a precision apparatus by fitting a trapezoidally-projecting dovetail into a trapezoidally-recessed dovetail groove to slide a sliding component with respect to a fixed component, and performing an operation of sliding the sliding component with a driving means, characterized in that:
the slide operation-type dovetail groove sliding stage comprises a sliding lock screw for locking sliding of the sliding component by causing the screw to abut on an inverted triangle-shaped protrusion, provided on a sidewall of the fixed component approximately parallel to a sliding direction and coupled to the fixed component, to bring the protrusion into contact with a dovetail of the sliding component, and by tightening it with a lever;
the slide operation-type dovetail groove sliding stage comprises a driving means which is provided on a sidewall of the sliding component approximately parallel to the sliding direction and which an operator grasps to perform an operation of sliding the sliding component to a desired position;
the driving means is an antislip rubber which is removably provided on the sliding component and which the operator grasps to perform the operation of sliding the sliding component to a desired position; and
the slide operation-type dovetail groove sliding stage further comprises a reaction force rod which is removably attached to the fixed component and takes reaction force with other fingers of the operator when he/she performs the operation of sliding the sliding component to a desired position, with the force application rod.

8. The slide operation-type dovetail groove sliding stage according to claim 7, characterized in that:
the antislip rubbers are attached, as a pair, to right and left sidewalls of the sliding component.

* * * * *